United States Patent
Marx et al.

(10) Patent No.: US 12,384,648 B2
(45) Date of Patent: Aug. 12, 2025

(54) VIBRATION-DAMPING APPARATUS FOR A WINDING DEVICE OF A TEXTILE MACHINE WHICH PRODUCES CROSS-WOUND PACKAGES

(71) Applicant: Saurer Spinning Solutions Gmbh & Co. KG, Ubach-Palenberg (DE)

(72) Inventors: Alexander Marx, Brüggen (DE); René Kalbertodt, Heinsberg (DE)

(73) Assignee: Saurer Spinning Solutions GmbH & Co., Übach-Palenberg (DE)

( * ) Notice: Subject to any disclaimer, the term of this patent is extended or adjusted under 35 U.S.C. 154(b) by 441 days.

(21) Appl. No.: 17/906,483

(22) PCT Filed: Mar. 17, 2021

(86) PCT No.: PCT/EP2021/056748
§ 371 (c)(1),
(2) Date: Sep. 16, 2022

(87) PCT Pub. No.: WO2021/185877
PCT Pub. Date: Sep. 23, 2021

(65) Prior Publication Data
US 2023/0140386 A1   May 4, 2023

(30) Foreign Application Priority Data
Mar. 19, 2020  (DE) .......................... 102020107585.5

(51) Int. Cl.
*B65H 54/52* (2006.01)
(52) U.S. Cl.
CPC ....... *B65H 54/52* (2013.01); *B65H 2601/524* (2013.01); *B65H 2701/31* (2013.01)

(58) Field of Classification Search
CPC ..................................................... B65H 54/52
See application file for complete search history.

(56) References Cited

U.S. PATENT DOCUMENTS 3,991,950 A * 11/1976 Tashiro ................. B65H 54/52
                                                  242/486.4
4,102,506 A *  7/1978 Raasch ................. B65H 54/52
                                                  242/542.3

(Continued)

FOREIGN PATENT DOCUMENTS

| DE | 3809421 A1 | 10/1988 |
| DE | 19515601 A1 | 10/1996 |
| DE | 19853316 A1 | 5/2000 |

*Primary Examiner* — Anna M Momper
*Assistant Examiner* — Nathaniel L Adams
(74) *Attorney, Agent, or Firm* — Fox Rothschild LLP

(57) ABSTRACT

The invention relates to a vibration-damping apparatus (18) for a winding device (4) of a textile machine (1), which textile machine produces cross-wound packages (5), the vibration-damping apparatus being provided for reducing the vibrations that occur at the pivotably mounted package cradle (8) during the winding operation of the textile machine (1).
According to the invention, in order to obtain a vibration-damping apparatus which is unproblematic both with regard to safety and with regard to contamination and which also always ensures a vibrationally relatively stable state of the package cradle, the vibration damper is in the form of a friction damper (20) having friction forces of different intensity depending on the working direction, the friction forces acting as the cross-wound package (5) lifts off during the winding operation being greater than the friction forces acting during the return of the cross-wound package (5).

7 Claims, 3 Drawing Sheets

(56) References Cited

U.S. PATENT DOCUMENTS

Figure 1:
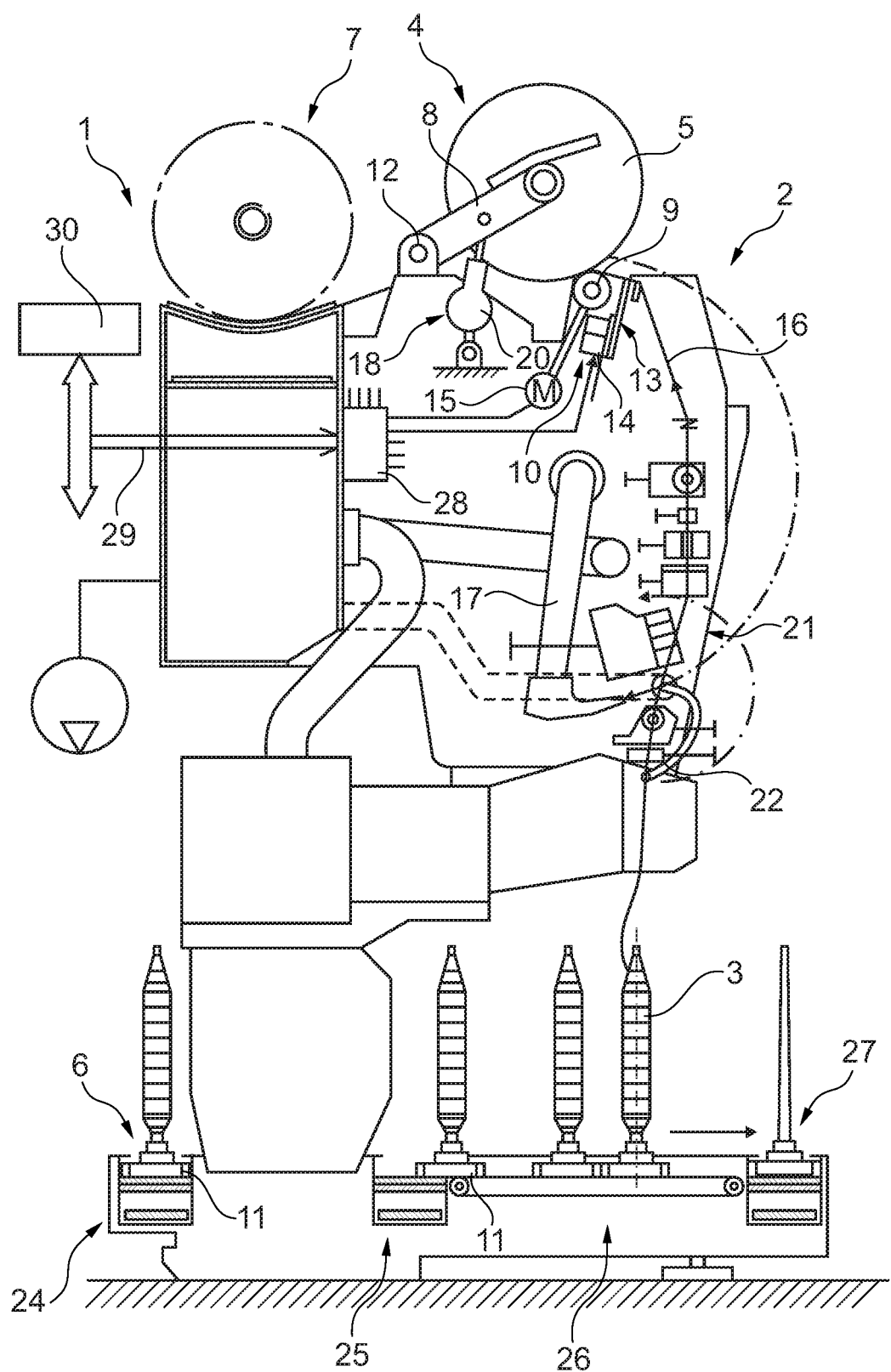

| | | | | |
|---|---|---|---|---|
| 5,163,631 A | * | 11/1992 | Borer | B65H 54/52 |
| | | | | 242/486.4 |
| 5,692,367 A | * | 12/1997 | Stahlecker | F16F 7/023 |
| | | | | 242/486.2 |
| 6,254,028 B1 | * | 7/2001 | Burchert | F16F 15/022 |
| | | | | 242/486.2 |
| 7,216,829 B2 | * | 5/2007 | Gallwitz | B65H 54/52 |
| | | | | 242/486.4 |

* cited by examiner

VIBRATION-DAMPING APPARATUS FOR A WINDING DEVICE OF A TEXTILE MACHINE WHICH PRODUCES CROSS-WOUND PACKAGES

CROSS REFERENCE TO RELATED APPLICATIONS

This application is the U.S. national phase of International Patent Application No. PCT/EP2021/056748, filed on Mar. 17, 2021, which claims priority to German Patent Application No. 10 2020 107585.5, filed on Mar. 19, 2020, the disclosures of which are incorporated herein by reference in their entirety.

The invention relates to a vibration-damping apparatus for a winding device of a textile machine that produces cross-wound packages, the vibration-damping apparatus being provided for reducing the vibrations that occur at the pivotably mounted package cradle during the winding operation of the textile machine.

During the winding operation of textile machines that produce cross-wound packages, for example open-end rotor spinning machines or automatic winding machines, there is always the risk of excessively intense vibrations of the package cradles at the workstations as the cross-wound packages are being wound. Especially at the start of a package journey and during the production of relatively hard cross-wound packages, there is often a risk that the amplitude of the cradle vibration will become so large that the winding process is critically impaired, i.e. that cross-wound packages are produced which can barely be unwound later and therefore are unusable.

In order to avoid producing such inferior cross-wound packages, in the spinning or winding machines of prior art the pivotably mounted package cradles of the winding devices are generally each equipped with a vibration-damping apparatus. That is, the pivotably mounted package cradle, which has two package cradle arms for freely rotatably holding a cross-wound package, has a damping apparatus, which should ensure that the vibrations of the package cradle, which are nearly unavoidable during the winding operation, are minimised as much as possible.

Such damping apparatuses for pivotably mounted package cradles have long been known and are described in various embodiments in the patent literature, in some cases in relatively great detail.

For example, vibration-damping apparatuses that have a damping and lifting cylinder are prior art. Such damping and lifting cylinders have a pneumatically operating device for the defined lifting of a cross-wound package held in the package cradle from the package drive roller or supporting roller of the cross-wound package and have a hydraulically operating damping apparatus. The damping apparatus preferably works with oil as the damping medium. That is, the package cradle vibrations occurring during the winding operation are reduced by influencing the flow of the liquid damping medium.

A vibration-damping apparatus designed in such a way is described, for example, in the manual "AUTOCONER 238" from Schlafhorst on pages 01.3.9 and 01.3.11.

Comparable vibration-damping apparatuses for the winding devices of textile machines that produce cross-wound packages are also disclosed in DE 41 21 780 A1, DE 195 34 333 A1 and DE 100 46 603 A1. That is, these patent applications also describe winding devices in the case of which the damping apparatuses for the package cradle are in the form of hydraulic cylinders.

For example, DE 41 21 780 A1 discloses and describes that, in such hydraulic cylinders, the pistons are each equipped with some through-holes, through which damping medium, for example hydraulic oil, located in the cylinder flows in the event of vibrations of the package cradle, leading to damping of the vibrations of the package cradle.

The vibration-damping apparatus described in DE 100 46 603 A1 also operates with a similar hydraulic cylinder. However, in this damping apparatus of prior art the damping medium of the hydraulic cylinder is formed by a rheologically variable liquid, i.e. by a liquid the viscosity of which can be varied by means of a magnetic field generator. In these damping cylinders of prior art in the form of hydraulic cylinders, a sealing ring is arranged between the cylinder lower part and the cylinder upper part.

Furthermore, such damping cylinders have a piston rod seal, which should prevent damping medium from escaping from the hydraulic cylinder. Although the sealing elements of these damping cylinders of prior art have been steadily improved over time, such hydraulically operating damping cylinders always have the risk that damping medium will escape, not only leading to soiling of the surroundings and often to worsening of the damping behaviour, a worsening which is not immediately noticeable, but also posing a significant fire hazard in conjunction with the fibre dust that is nearly unavoidable in textile companies.

Therefore, various attempts to replace such hydraulically operating damping apparatuses with damping apparatuses that do not need any liquid damping medium have already been undertaken in the past.

For example, the Swiss patent document CH 374 003 describes a damping apparatus that has an energisable electromagnet, which acts on an armature plate, which in turn is connected by means of a rod to the pivotably mounted package cradle to be damped. That is, in the case of this damping apparatus of prior art, a force component that presses the ferromagnetic armature plate connected to the package cradle onto a stationary abutment is produced by means of an electromagnet which, as is known, contains an energisable coil. The damping behaviour of this known damping apparatus thus results from the mechanical friction between the movably mounted armature plate and the stationary abutment.

A comparable but contactlessly operating electromagnetic damping apparatus is also disclosed in DE 100 12 005 B4. This damping apparatus has a movable, electrically conductive component, which is at least indirectly connected to the package cradle and is arranged in such a way that the component contactlessly intersects the magnetic field of a stationary magnet system. The damping behaviour of this damping apparatus of prior art is based on the formation of eddy currents in the electrically conductive component. However, in practice it has been found that both the damping apparatuses according to the patent document CH 374 003 and the damping apparatuses according to DE 100 12 005 B4 have various disadvantages. For example, in the case of the damping apparatuses based on the eddy current principle, the force induced on the conductive component by the magnetic field of the magnet system was not sufficient for achieving satisfactory damping. The damping apparatuses described above were never able to establish themselves in practice.

Furthermore, DE 26 06 859 A1, DE 10 2007 047 554 A1 and DE 199 24 390 A1 also disclose winding devices for the workstations of textile machines that produce cross-wound packages, in the case of which winding devices each package cradle pivotably mounted on the machine frame of the textile machine is equipped with a damping apparatus. The damping apparatuses operate as friction dampers, similarly to the damping apparatus disclosed in patent document CH 374 003.

For example, in the device according to DE 26 06 859 A1, a movably mounted package cradle is equipped with a braking element, which is mounted so as to be damped and corresponds with a stationary counter-body. That is, the braking element has brake pads, which contact a counter-body arranged so as to be stationary on the machine frame of the textile machine.

A device equipped with a friction element, for damping the vibrations occurring at the package cradle during the winding process of a cross-wound package, is also described in DE 10 2007 047 554 A1. In the case of this damping apparatus, a counter-body, which is likewise arranged so as to be stationary on the machine frame of the textile machine, is acted upon by a friction element, which can be acted upon by a pneumatic cylinder.

The damping apparatus described in DE 199 24 390 A1 has a guide rod, which is movably fastened to the package cradle and which corresponds with braking elements of a cylinder device, which cylinder device is arranged on the machine frame of the textile machine and is mounted for limited movement. That is, a slidable, pneumatically actu-atable piston, inter alia, is mounted in the cylinder device, which piston applies a braking element to the guide rod and thus initiates a friction torque, which leads to vibration-damping of the package cradle in question during the winding operation.

As indicated above, the damping apparatuses of prior art have various disadvantages, which means that these damping apparatuses can be improved.

Proceeding from the prior art indicated above, the invention addresses the problem of developing a vibration damper for a pivotably mounted package cradle of a winding device of a textile machine that produces cross-wound packages, the vibration damper being unproblematic with respect to the likeliness of soiling, and the vibration damper ensuring that the package cradle is relatively stable with respect to vibration during the winding process.

This problem is solved according to the invention in that the vibration damper is in the form of a friction damper which has friction forces of different intensity depending on the working direction, the friction forces effective as the cross-wound package lifts off during the winding operation being greater than the friction forces effective during the return movement of the cross-wound package.

The dependent claims relate to advantageous embodiments of the invention.

The vibration damper designed according to the invention not only has the advantage that, because of the design as a mechanically operating friction damper, the risk of soiling of the workstation by escaping damping medium is eliminated, but also the advantage that, because of the friction damper's special design according to the invention, the problem of the constant lifting off of the cross-wound package due to vibration is minimised during the winding process. That is, the friction damper designed according to the invention produces direction-dependent friction forces, the friction forces that become effective in the blocking direction as the cross-wound package lifts off being significantly greater than the friction forces effective during the lowering of the cross-wound package. The compact design of the friction damper also allows the damping apparatus according to the invention to be retrofitted on workstations of textile machines with package cradles that have formerly been equipped with hydraulic damping cylinders. That is, only few minor modifications are required in the region of the workstations of textile machines in order to be able to advantageously install the friction dampers designed according to the invention.

In an advantageous embodiment, the friction damper according to the invention has: a braking rod, which is mounted for sliding relative to the damper housing of the vibration damper; a stationary first braking element; and a movably mounted second braking element, which can be placed against the braking rod by means of a support lever.

As a result of such a design, the friction damper has a blocking direction and an idle direction. For this purpose, the support lever is arranged at an angle to the braking rod in such a way that the second braking element is automatically pressed against the braking rod more strongly when the cross-wound package attempts to lift off from its associated package drive drum. That is, if the cross-wound package, which lies on the package drive drum and is driven by the package drive drum by means of frictional contact, begins to vibrate during the winding process, for example because of a small out-of-roundness, torques are immediately transferred to the package cradle. The torque that attempts to lift the package cradle and thus also the housing of the vibration damper immediately causes a stronger pressure to be applied to the second braking element, with the result that a strong friction torque is produced.

At this time, the vibration damper works in what is referred to as the blocking direction.

In another advantageous embodiment, the vibration damper has a spring element, which acts, in frictional contact, on the support lever, the support lever being arranged at angle to the braking rod. The spring element is preferably a compression spring, the compressive force of the spring element being adjustable by means of an adjusting screw. Such a design ensures that the friction force with which the braking elements contact the braking rod in the assembled state can be adjusted in a defined manner. That is, the magnitude of the friction force acting on the braking rod can be influenced by means of the compressive force of the spring element and it can thus be ensured that the support lever reliably becomes effective in the blocking direction as needed.

In an advantageous embodiment, one end of the support lever is connected to the second braking element such that limited movement is allowed, while the other end is supported in a guide of the damper housing by means of a guiding and arresting device. The guiding and arresting device is slidably mounted in the preferably circular-arc-shaped guide of the damper housing and can be positioned there in a defined manner. The advantageously arranged guiding and arresting device forms a pivoting and support point for the support lever during operation. This means that, by appropriately positioning the guiding and arresting device in the circular-arc-shaped guide of the damper housing, the angle that the support lever assumes in relation to the braking rod can be set and thus the contact pressure of the second braking element can be influenced, which contact pressure greatly contributes to the friction torque.

In another advantageous embodiment, the first braking element and the second braking element are identical components. That is, the first braking element and the second braking element each have two through-bores for fastening and one recess. A brake lining can be exchangeably installed in each recess.

The use of identical braking elements has the advantage that the number of differently designed components can be minimised and thus the production costs of the friction damper designed according to the invention can be kept relatively low. Equipping the braking elements with exchangeable brake linings also allows orderly, economical operation of the friction damper according to the invention. If the operating personnel determine, for example, that a cross-wound package is not running completely smoothly during the winding process, this can be due to somewhat weakened damping behaviour of a friction damper according to the invention. In such a case, this can be easily dealt with by simply exchanging the brake linings, thus restoring the optimal friction conditions of the damping cylinder.

The invention is explained in greater detail below on the basis of an embodiment example shown in the drawings.

Figure 2:
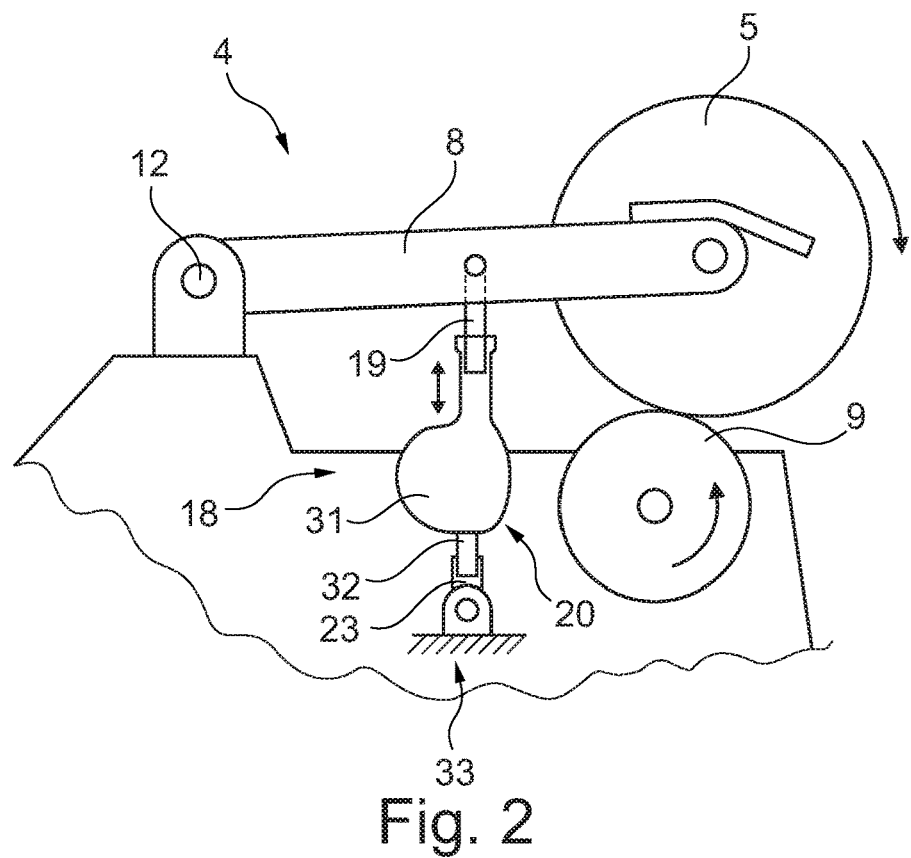
Figure 4:
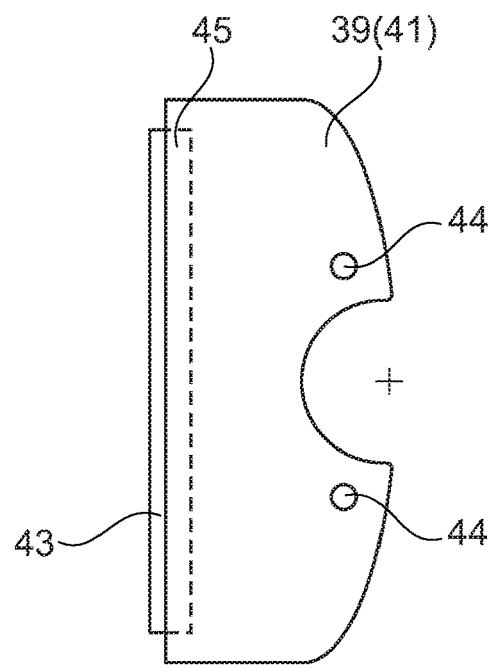
Figure 3:
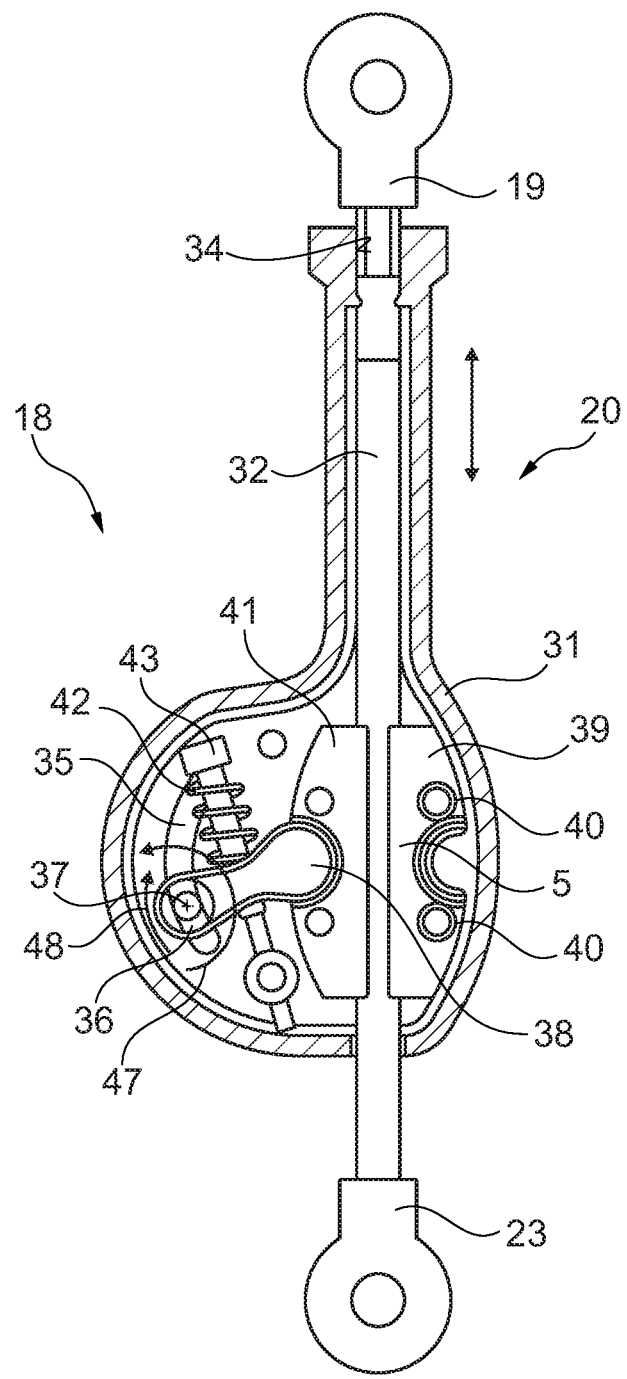

In the drawings:

FIG. 1 shows a side view of a workstation of a textile machine that produces cross-wound packages, in the embodiment example of an automatic winding machine, comprising a winding device, the package cradle of which is equipped with a friction damper designed according to the invention, FIG. 2 shows, schematically and at a somewhat larger scale, a winding device of a workstation of a textile machine that produces cross-wound packages, which winding device is equipped with a friction damper designed according to the invention, FIG. 3 shows a sectional view of a friction damper designed according to the invention, and FIG. 4 shows a braking element of a friction damper designed according to the invention.

FIG. 1 shows a schematic side view of a workstation 2 of a textile machine that produces cross-wound packages, in the embodiment example of an automatic winding machine 1. As is known and therefore not explained in greater detail, spinning cops 3, which were produced on ring spinning machines upstream in the production process and have only relatively little yarn material, are rewound to form large-volume cross-wound packages 5 at the workstations 2 of such textile machines 1.

Such automatic winding machines 1 often have a cop and tube transport system 6, in which transport plates 11 circulate, on which transport plates 11 vertically oriented spinning cops 3 or empty tubes are arranged. Of this cop and tube transport system 6, only the cop supply line 24, the reversibly drivable storage line 25, one of the cross-transport lines 26 leading to the winding units 2, and the tube return line 27 are shown in FIG. 1.

Finished cross-wound packages 5 are typically transferred by means of an automatically operating service unit (not shown), preferably a package doffer, to a machine-long cross-wound package transport device 7 and are transported by the package transport device 7 to a package loading station or the like arranged at a machine end.

The numerous, identical workstations 2 of such textile machines 1 each have various devices necessary for orderly operation of such a textile machine. The workstations 2 each have, for example, a winding device 4, which has: a package cradle 8; a package drive roller 9; and a thread traversing device 10 for the traversing of the thread 16 running onto the take-up package. The package cradle 8 is mounted for limited movement about a pivot axis 12, which runs parallel to the axis of rotation of a cross-wound package 5. That is, during the winding operation the surface of the cross-wound package 5 rotatably held in the package cradle 8 lies on the package drive roller 9 and said cross-wound package 5 is driven by the package drive roller 9 by means of friction. Furthermore, a damping apparatus 18 is connected to the package cradle 8 in order to reduce the vibrations that occur as the cross-wound package 5 rolls during the winding process, which damping apparatus 18 has a friction damper 20 designed according to the invention, which friction damper 20, as explained in greater detail below on the basis of FIG. 3, produces different friction forces depending on direction.

As indicated in FIG. 1, the package drive roller 9 is individual-motor-driven by means of an electric motor 15, which is connected to a workstation computer 28 by means of a control line. The drive 14 of the thread traversing device 10, which thread traversing device 10 preferably has a finger thread guide 13 which, during the winding operation, causes the thread 16 running onto the take-up package to traverse, is likewise connected to the workstation computer 28 by means of a control line, the workstation computer 28 being connected in turn to the central control unit 30 of the automatic winding machine 1 by means of a bus system 29.

The workstations 2 of such automatic winding machines 1 generally also each have a thread joining device 21, such as a pneumatic splicer, a gripper tube 22 for handling the lower thread, and a suction nozzle 17, by means of which the upper thread that has run onto the cross-wound package 5 after a winding interruption can be received and inserted into the thread joining device 21.

FIG. 2 shows, schematically and at a somewhat larger scale, a winding device 4 of a workstation 2 of a textile machine 1 that produces cross-wound packages, the winding device 4 having a vibration-damping apparatus 18 designed according to the invention. As indicated, the vibration-damping apparatus 18 has a friction damper 20, the damper housing 31 of which is connected to the package cradle 8 by means of a first mounting rod 19 and therefore can move with the package cradle 8.

As can be seen, additionally the braking rod 32 of the friction damper 18 is connected to a stationary mounting point 33 of the workstation 2 by means of a second mounting rod 23.

The friction damper 20 of the vibration-damping apparatus 18 as shown in a sectional view and in detail in FIG. 3, said friction damper 20 being designed according to the invention, has a damper housing 31, which is provided with a connecting screw thread 34 at the top. A first mounting rod 19 can be fastened in said connecting screw thread 34, by means of which first mounting rod 19 the damper housing 31 is connected to the package cradle 8 in the assembled state. A braking rod 32 is arranged within the damping housing 31 and is connected to a stationary mounting point 33 by means of a second mounting rod 23. The damper housing 31 is mounted for sliding relative to the braking rod 32.

As can also be seen, two identical braking elements 39, 41 are in frictional contact with the braking rod 32. The first braking element 39 is stationarily fastened in the damping housing 31, for example by means of threaded bolts 40, while the second braking element 41 is movably mounted in the damper housing 31. That is, the damping housing 31 has a circular-arc-shaped guide 35, in which a guiding and arresting device 36 is slidably arranged in such a way that the guiding and arresting device 36 can be positioned in a functionally correct manner if necessary. The guiding and arresting device 36 forms a pivoting and support point 37 for a support lever 38. The support lever 38 is, for its part, arranged at an angle to the braking rod 32 and is also connected to the second braking element 41 such that limited movement is allowed. As is shown, the support lever 38 is also acted upon by a spring element, preferably a compression spring 42, the effective compressive force of which can be set by means of an adjustment screw 43.

FIG. 4 shows one of the identical braking elements 39, 41.

The braking elements 39, 41 each have two through-bores 44 for fastening the braking elements as required and a recess 45 for securely receiving an exchangeable brake lining 46. That is, the first braking element 39 can be stationarily fastened in the damper housing 31 by means of threaded bolts 40, which penetrate the through-bores 44. An exchangeable brake lining 46 can be installed in each of the recesses 45, i.e. a braking lining 46 that can be easily exchanged if necessary.

Function of a Friction Damper Designed According to the Invention:

During the winding operation, the package cradle 8 is constantly caused to vibrate by the cross-wound package 5, which lies on the package drive drum 9 and is driven by the package drive drum 9 by means of frictional contact, i.e. the cross-wound package 5, which runs in a somewhat unsmooth manner, lifts off somewhat from the package drive drum 9 again and again.

These vibrations are transferred by means of the first mounting rod 19 to the damper housing 31 of the friction damper 20, the braking rod 32 of which friction damper 20 is stationarily connected to a mounting point 33 by means of the second mounting rod 23. That is, every time the cross-wound package 5 lifts off from its associated package drive drum 9, a lifting torque is also applied to the damper housing 31, which lifting torque is opposed by the braking elements 39, 41, which are in frictional contact with the braking rod 32.

In the case of the friction damper 20 designed according to the invention, the lifting off of the cross-wound package 5 has the result that the damper housing 31 of the friction damper 20 designed according to the invention is acted upon in such a way that, as indicated by the arrow 48, a torque is applied to the support lever 38, which is arranged at an angle, which torque exerts an additional torque on the braking element 41, and consequently the braking force of the braking elements 39, 41, which is defined by the compression spring 42, is significantly increased and thus the upward swing of the package cradle 8 is greatly reduced or nearly prevented.

During the subsequent downward swing of the package cradle 8, which is opposite to the so-called blocking direction of the friction damper 20, the damper housing 31 is also acted upon toward the package drive drum 9, and consequently, as indicated by the arrow 47, the angled support lever 38 is acted upon in such a way that no additional torque is exerted on the second braking element 41 any longer. The braking force exerted on the braking rod 32 by the braking elements 39, 41 is thereby significantly reduced and the package cradle 8 can swing back into a position in which the cross-wound package 5 properly rolls on the package drive drum 9 again.

As is clear and already indicated above, the vibration damper apparatus 18 having the friction damper 20 designed according to the invention is very compact and therefore can also be retrofitted on textile machines that have already been delivered, i.e. on textile machines that were previously equipped with damping cylinders, which are often somewhat problematic because of their hydraulic damping medium. Because of their compact design, the use of the friction dampers 20 according to the invention does not result in any obstruction of possible service units.

| List of reference signs | |
|---|---|
| 1 | Automatic winding machine |
| 2 | Workstation |
| 3 | Spinning cop |
| 4 | Winding device |
| 5 | Cross-wound package |
| 6 | Cop and tube transport device |
| 7 | Cross-wound package transport device |
| 8 | Package cradle |
| 9 | Package drive drum |
| 10 | Thread traversing device |
| 11 | Transport plate |
| 12 | Pivot axis |
| 13 | Finger thread guide |
| 14 | Drive |
| 15 | Electric motor |
| 16 | Thread |
| 17 | Suction nozzle |
| 18 | Damping apparatus |
| 19 | First mounting rod |
| 20 | Friction damper |
| 21 | Thread joining device |
| 22 | Gripper tube |
| 23 | Second mounting rod |
| 24 | Cop supply line |
| 25 | Storage line |
| 26 | Cross-transport line |
| 27 | Tube return line |
| 28 | Workstation computer |
| 29 | Bus system |
| 30 | Central control unit |
| 31 | Damper housing |
| 32 | Braking rod |
| 33 | Stationary mounting point |
| 34 | Connecting screw thread |
| 35 | Circular-arc-shaped guide |
| 36 | Guiding and arresting device |
| 37 | Pivoting and support point |
| 38 | Support lever |
| 39 | First braking element |
| 40 | Threaded bolt |
| 41 | Second braking element |
| 42 | Compression spring |
| 43 | Adjustment screw |
| 44 | Through-bore |
| 45 | Recess |
| 46 | Brake lining |
| 47 | Arrow |
| 48 | Arrow |

The invention claimed is:

1. A vibration-damping apparatus (18) for a winding device (4) of a textile machine (1) that is configured to produce cross-wound packages (5), the vibration-damping apparatus (18) being configured for reducing vibrations that occur at a pivotably mounted package cradle (8) during a winding operation of the textile machine (1), the vibration-damping apparatus (18) comprising:
   a friction damper (20), configured to exert friction forces of different intensities, depending on a working direction, the friction damper (20) comprising:
       a braking rod (32), mounted for sliding relative to a damper housing (31) of the friction damper (20);
       a stationary first braking element (39); and
       a movably mounted second braking element (41), configured to be placed against the braking rod (32) via a movable support lever (38),
   wherein:
       friction forces that are effective as a cross-wound package (5) lifts off during a winding operation are greater than friction forces effective during a return movement of the cross-wound package (5), and
       one end of the movable support lever (38) is connected to the second braking element (41) such that limited movement is allowed, while another end is supported in a guide (35) of the damper housing (31) via a guiding and arresting device (36).

2. The vibration-damping apparatus (18) according to claim 1, further comprising a spring element (42) configured to act, in frictional contact, on the movable support lever (38),
wherein the support lever (38) is arranged at an angle to the braking rod (32).

3. The vibration-damping apparatus (18) according to claim 2, wherein the spring element (42) comprises a compression spring (42), wherein the compression spring (42) is configured such that an effective compressive force of the compression spring (32) can be set in a defined manner via an adjustment screw (43).

4. The vibration arresting apparatus (18) according to claim 1, wherein the guiding and arresting device (36) is configured to form a pivoting and support point (37) for the movable support lever (38) and is mounted in the guide (35) of the damper housing (31) such that the guiding and arresting device (36) can be slid therein and can be positioned therein in a defined manner.

5. The vibration-damping apparatus (18) according to claim 1, wherein the guide (35) is part-circular-shaped.

6. The vibration-damping apparatus (18) according to claim 1, wherein the first braking element (39) and the second braking element (41) are identical.

7. The vibration-damping apparatus (18) according to claim 6, wherein the first braking element (39) and the second braking element (41) are each equipped with:
through-bores (40) configured to enable fastening, and
a recess (45) for an exchangeable brake lining (46).

* * * * *